(12) United States Patent
Olechowski et al.

(10) Patent No.: US 10,848,794 B2
(45) Date of Patent: *Nov. 24, 2020

(54) DIGITAL DATA STREAMING USING SERVER DRIVEN ADAPTIVE BITRATE

(71) Applicant: Plex, Inc., Los Gatos, CA (US)

(72) Inventors: Scott Olechowski, San Jose, CA (US); Elan Feingold, Haiku, HI (US); Greg Edmiston, Seattle, WA (US); Graham Booker, College Station, TX (US)

(73) Assignee: Plex, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,233

(22) Filed: May 6, 2019

(65) Prior Publication Data

US 2019/0261038 A1    Aug. 22, 2019

Related U.S. Application Data

(63) Continuation of application No. 15/489,154, filed on Apr. 17, 2017, now Pat. No. 10,334,287.

(51) Int. Cl.
*H04N 21/2343* (2011.01)
*H04L 29/06* (2006.01)
*H04N 21/24* (2011.01)

(52) U.S. Cl.
CPC ... *H04N 21/234309* (2013.01); *H04L 65/602* (2013.01); *H04L 65/80* (2013.01); *H04N 21/23439* (2013.01); *H04N 21/2402* (2013.01)

(58) Field of Classification Search
CPC ... H04L 65/80; H04L 65/4084; H04L 65/602; H04L 65/60; H04L 47/25; H04L 49/9005;

(Continued)

(56) References Cited

U.S. PATENT DOCUMENTS 5,630,067 A * 5/1997 Kindell ............... G06F 9/5011
709/231
7,389,379 B1 * 6/2008 Goel .................. G06F 11/1662
711/112

(Continued)

FOREIGN PATENT DOCUMENTS

WO    WO-2005081465 A1 * 9/2005 ............. H04L 49/90

OTHER PUBLICATIONS

U.S. Appl. No. 15/489,154, filed Apr. 17, 2017, Office Action, dated Jun. 29, 2017.

(Continued)

*Primary Examiner* — Ninos Donabed
(74) *Attorney, Agent, or Firm* — Baker Botts L.L.P.

(57) ABSTRACT

A method and system for server driven adaptive transcoding is provided. A transcoding server computer may initially receive a first portion of a particular media file from a media file repository. The transcoding server computer may transcode the first portion of the particular media file into a first transcoded media segment of a first quality and send the first transcoded segment to a client computing device. The transcoding server computer may receive a second portion of the particular media file from the media file repository, transcode the second portion of the particular media file into a second transcoded media segment of a second quality different than the first quality, and send the second transcoded media segment to the client computing device.

16 Claims, 4 Drawing Sheets

(58) Field of Classification Search
CPC ....... H04L 65/608; H04L 67/02; H04L 67/32; H04L 65/605; H04L 67/322; H04L 47/10; H04L 47/20; H04L 43/045; H04L 47/125; H04N 21/23406; H04N 21/44004; H04N 21/2402; H04N 21/26258; H04N 21/2662; H04N 21/8456; H04N 21/23439; H04N 21/4424; H04N 21/4392; H04N 21/6379

See application file for complete search history.

(56) References Cited

U.S. PATENT DOCUMENTS

| | | | | |
|---|---|---|---|---|
| 8,626,943 | B2* | 1/2014 | Balachandran | G06F 15/16 709/228 |
| 8,812,673 | B2 | 8/2014 | Balachandran | |
| 2006/0101081 | A1* | 5/2006 | Lin | G06F 16/2343 |
| 2008/0098123 | A1* | 4/2008 | Huang | H04L 67/104 709/231 |
| 2008/0186849 | A1* | 8/2008 | Kampmann | H04L 47/263 370/232 |
| 2008/0239955 | A1* | 10/2008 | Chang | H04L 47/10 370/232 |
| 2009/0083431 | A1* | 3/2009 | Balachandran | G06F 15/16 709/228 |
| 2009/0089447 | A1* | 4/2009 | Balachandran | G06F 15/16 709/231 |
| 2009/0116503 | A1* | 5/2009 | Sebastian | H04L 47/30 370/412 |
| 2010/0146082 | A1* | 6/2010 | Isobe | H04L 12/2861 709/219 |
| 2013/0282918 | A1* | 10/2013 | De Vleeschauwer | H04N 21/8455 709/231 |
| 2014/0286258 | A1* | 9/2014 | Chowdhury | H04L 1/1854 370/329 |
| 2014/0304320 | A1 | 10/2014 | Taneja | |
| 2015/0033277 | A1 | 1/2015 | Li | |
| 2015/0127296 | A1 | 5/2015 | Thomas | |
| 2016/0282165 | A1 | 9/2016 | Allen | |
| 2016/0315862 | A1* | 10/2016 | Shum | H04L 67/1008 |
| 2017/0171019 | A1* | 6/2017 | Nayak | H04L 49/357 |
| 2017/0171091 | A1* | 6/2017 | Nayak | H04L 47/25 |
| 2017/0242079 | A1 | 8/2017 | Duan | |
| 2017/0272305 | A1* | 9/2017 | Lu | H04L 41/0604 |
| 2017/0279725 | A1* | 9/2017 | Lee | H04W 88/18 |
| 2018/0205777 | A1* | 7/2018 | Khan | G06F 16/9574 |

OTHER PUBLICATIONS

Olechowski, U.S. Appl. No. 15/489,154, filed Apr. 17, 2017, Office Action, dated Oct. 30, 2018.
Olechowski, U.S. Appl. No. 15/489,154, filed Apr. 17, 2017, Office Action, dated Mar. 27, 2018.
Olechowski, U.S. Appl. No. 15/489,154, filed Apr. 17, 2017, Notice of Allowance, dated Mar. 15, 2019.
Olechowski, U.S. Appl. No. 15/489,154, filed Apr. 17, 2017, Interview Summary, dated Dec. 21, 2017.
Olechowski, U.S. Appl. No. 15/489,154, filed Apr. 17, 2017, Final Office Action, dated Nov. 17, 2017.

* cited by examiner

DIGITAL DATA STREAMING USING SERVER DRIVEN ADAPTIVE BITRATE

BENEFIT CLAIM

This application claims the benefit under 35 U.S.C. § 120 as a Continuation of application Ser. No. 15/489,154, filed Apr. 17, 2017, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The technical field of the present disclosure generally relates to computer hardware, software, and systems that implement communications between client computing devices and server computers. The technical field of the disclosure also is computer hardware, software and systems that are programmed for transcoding of digital media files.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital video streaming over packet-based networks is a common method for user computers to view videos that are stored on different devices. Video streaming allows user computers to access and watch a larger number of videos than could be stored on the user computer. Generally, a video is stored on a separate server computer and is sent to client computing devices for viewing.

Often, a client computing device is unable to efficiently stream a video stored in its source formatting. For example, a client computing device may be unable to download a file as fast as the file is played, thereby forcing the streamed video to pause every time the playback of the file catches up to the end of the downloaded portion of the file. The ability of the client computing device to stream videos may be based on an internet connection, the type of device, the hardware of the device, and/or any other activities being performed by the device. A computer that is currently downloading a 16 GB file will generally have lower streaming capabilities than a similarly situated computer that is not downloading a 16 GB file.

Due to the inability of many computing devices to stream video files in their source formatting, video files are often transcoded into different formats for streaming by different client computing devices. Transcoding generally refers to the conversion of a digital file from one encoding to another encoding. Transcoding video files may refer to changing the format of a video file in order to ensure compatibility with a client computing device, changing the codec of a video file, changing a bitrate of a file, such as by compressing the file, and/or changing a resolution of a file.

Many streaming services will store multiple versions of digital media files that have been transcoded into different formats, bitrates, and/or resolutions. For example, a video may be transcoded into transcoded versions of the video at 1080 p, 720 p, and 480 p bitrates and stored on a server computer. If a client computing device requests a stream at 720 p, the server computer sends the 720 p version of the video to the client computing device.

Storing multiple copies of each video tends to be efficient for delivering videos that are frequently viewed. For example, a video streaming service that receives hundreds of requests for a single video during a day likely has increased capabilities to store multiple versions of each video on a server computer. The same may not be true for a personal server computer which is accessed by a few people in a household and receives requests for access to particular video files rarely. In such cases, storing multiple copies of every single video file becomes a large drain on the storage of the personal server computer. Additionally, much of that storage may be unnecessary as some files may never be accessed or may be accessed less than a handful of times.

While the server computer could store one transcoded version of each file based on the requesting devices, doing so does not take into account changing needs over time. Due to changes in connectivity, a client computing device may lose the capability to download or stream files of a certain size without causing delay in the playback of the files. Servers that store multiple versions of the same file are capable of adapting by a streaming a lower quality version of the file when the client's connection is negatively impacted. A server that does not store multiple transcoded versions of a file does not retain the capability to adapt to changes in connectivity of the client device.

Additionally, the server computer may be unable to provide the highest quality video file that a client computing device is capable of effectively viewing. Thus, a user may be stuck viewing a low quality version of a video file because higher quality transcoded versions of the video file are unavailable.

Thus, there is a need for a method for providing transcoded versions of a digital media file that can adapt to capabilities of a client computing device without requiring the storage of multiple transcoded versions of each digital media file on a server computer. Such a technique would be useful for on-the-fly transcoding of video files and/or portions of video files.

SUMMARY OF INVENTION

The appended claims may serve to summarize the invention.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods are provided for transcoding of digital media files as the files are transmitted via streaming over a digital data network. A digital media file may be stored in a media file repository that is separate from a client computing device. When the client computing device requests the digital media file, a transcoding server computer transcodes a first portion of the digital media file into a transcoded digital media segment of a first quality and sends the transcoded digital media segment to the client computing device. If the transcoding server computer determines that the quality of the digital media file should change due to one or more factors, such as the capabilities of the client computing device, capabilities of the transcoding server computer, load balancing of multiple clients accessing digital media files, or the performance of the network between the client computing device and the server computer, then the transcoding server computer may begin transcoding the next portions of the digital media file into transcoded segments of different qualities.

In an embodiment, a method comprises receiving, at a transcoding server computer, a first portion of a particular media file from a media file repository; transcoding the first portion of the particular media file into a first transcoded media segment of a first quality; transmitting the first transcoded media segment to a client computing device; receiving, at the transcoding server computer, a second portion of the particular media file from the media file repository; transcoding the second portion of the particular media file to a second transcoded media segment of a second quality that is different than the first quality; sending the second transcoded media segment to the client computing device.

Structural Overview

Figure 1:
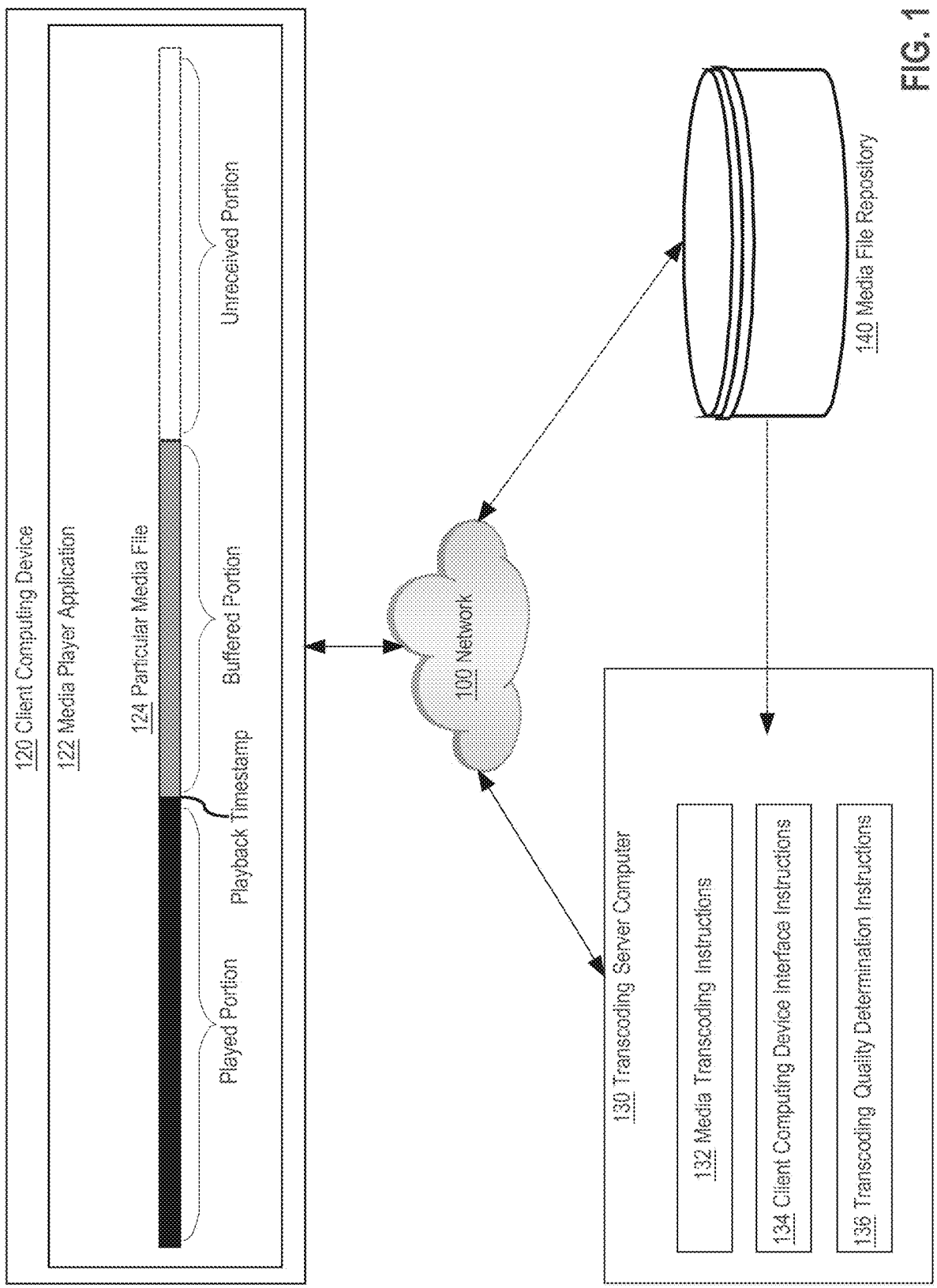
FIG. 1 depicts an example networked computer system in which the techniques described may be practiced, according to one embodiment.

FIG. 1 depicts an example networked computer system in which the techniques described may be practiced, according to one embodiment.

In the example of FIG. 1, a client computing device 120 and a transcoding server computer 130 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The client computing device 120, transcoding server computer 130, and other elements of the system each comprise an interface compatible with the network 100 and are programmed or configured to use standardized protocols for communication across the networks such as TCP/IP, Bluetooth, and higher-layer protocols such as HTTP, TLS, and the like. As described further herein, a media file repository 140 may be hosted on the transcoding server computer 130 and/or on a separate server computer.

Client computing device 120 is a computer that includes hardware capable of communicatively coupling client computing device 120 to one or more server computers, such as transcoding server computer 130 over one or more service providers. For example, client computing device 120 may include a network card that communicates with transcoding server computer 130 through a home or office wireless router (not illustrated in FIG. 1) coupled to an internet service provider. Client computing device 130 may be a smart phone, personal computer, tablet computing device, PDA, laptop, set-top boxes, smart televisions, or any other computing device capable of transmitting and receiving information and performing the functions described herein.

In an embodiment, a media player application 122 is stored on client computing device. The media player application 122 may be programmed or configured to play digital media files, store portions of digital media files in a buffer, request additional segments of digital media files, and identify a playback timestamp.

In FIG. 1, media player application 122 is depicted as currently playing particular media file 124. The playback timestamp refers to a current location in the playback of the particular media file. The played portion of the particular media file 124 refers to a portion of the file that has already been played through the media player application. The buffered portion of the particular media file 124 refers to a portion of the particular media file 124 that has been received by media player application but has not been played yet. Finally, the unreceived portion of the particular media file corresponds to one or more remaining segments of the particular media file 124 that is stored in media file repository 140 but has not been received by media application 122.

Transcoding server computer 130 may be implemented using a server-class computer or other computer having one or more processor cores, co-processors, or other computers. In some embodiments, transcoding server computer 130 may also include a client computing device, such as a smart phone and/or laptop computer.

FIG. 1 depicts client computing device 120, transcoding server computer 130, and media file repository 140 as distinct elements for the purpose of illustrating a clear example. However, in other embodiments more or fewer server computers may accomplish the functions described herein. For example, transcoding server computer 130 may store media file repository 140 in memory of transcoding server computer 130. As another example, transcoding server computer 130 may interact with a plurality of client computing devices requesting data from media file repository 140. Additionally, media file repository 140 may be any source of a digital media file. For example, the methods described herein may be utilized on a device that streams video as it is being captured.

Each of media transcoding instructions 132, client computing device interface instructions 134, and transcoding quality determination instructions 136 comprises a set of one or more pages of main memory, such as RAM, in a server computer into which executable instructions have been loaded and which, when executed, cause the transcoding server computer to perform the functions or operations that are described herein with reference to those modules. For example, the media transcoding instructions 132 may comprise a set of pages in RAM that contain instructions which when executed cause performing the media transcoding functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of media transcoding instructions 132, client computing device interface instructions 134, and transcoding quality determination instructions 136 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those modules. In other words, the drawing figure may represent the manner in which programmers or software developers organize and arrange source code for later compilation into an executable, or interpretation into bytecode or the equivalent, for execution by the transcoding server computer.

Media transcoding instructions 132 comprise computer readable instructions in a portion of memory of transcoding server computer 130 and which, when executed by one or more processors, cause transcoding server computer 130 to convert a digital media file from one encoding to another encoding.

Client computing device interface instructions 134 comprise computer readable instructions in a portion of memory of transcoding server computer 130 and which, when executed by one or more processors, cause transcoding server computer 130 to request data from client computing device 120 and send transcoded segments of digital media files to the client computing device 120.

Transcoding quality determination instructions 136 comprise computer readable instructions in a portion of memory of transcoding server computer 130 and which, when executed by one or more processors, cause transcoding server computer 130 to determine a quality into which to transcode a particular media file based on one or more factors.

Media file repository 140 is a repository of digital media files. Media file repository 140 may be stored on a server computer system separate from the transcoding server computer 130. The separate server computer system may be a physical server computer, such as a personal server, or a virtual server provisioned in the cloud. The separate server computer system may communicate with transcoding server computer 130 over network 100. Additionally or alternatively, media file repository 140 may be stored in memory of transcoding server computer 130.

Transcoding During File Streaming

Figure 2:
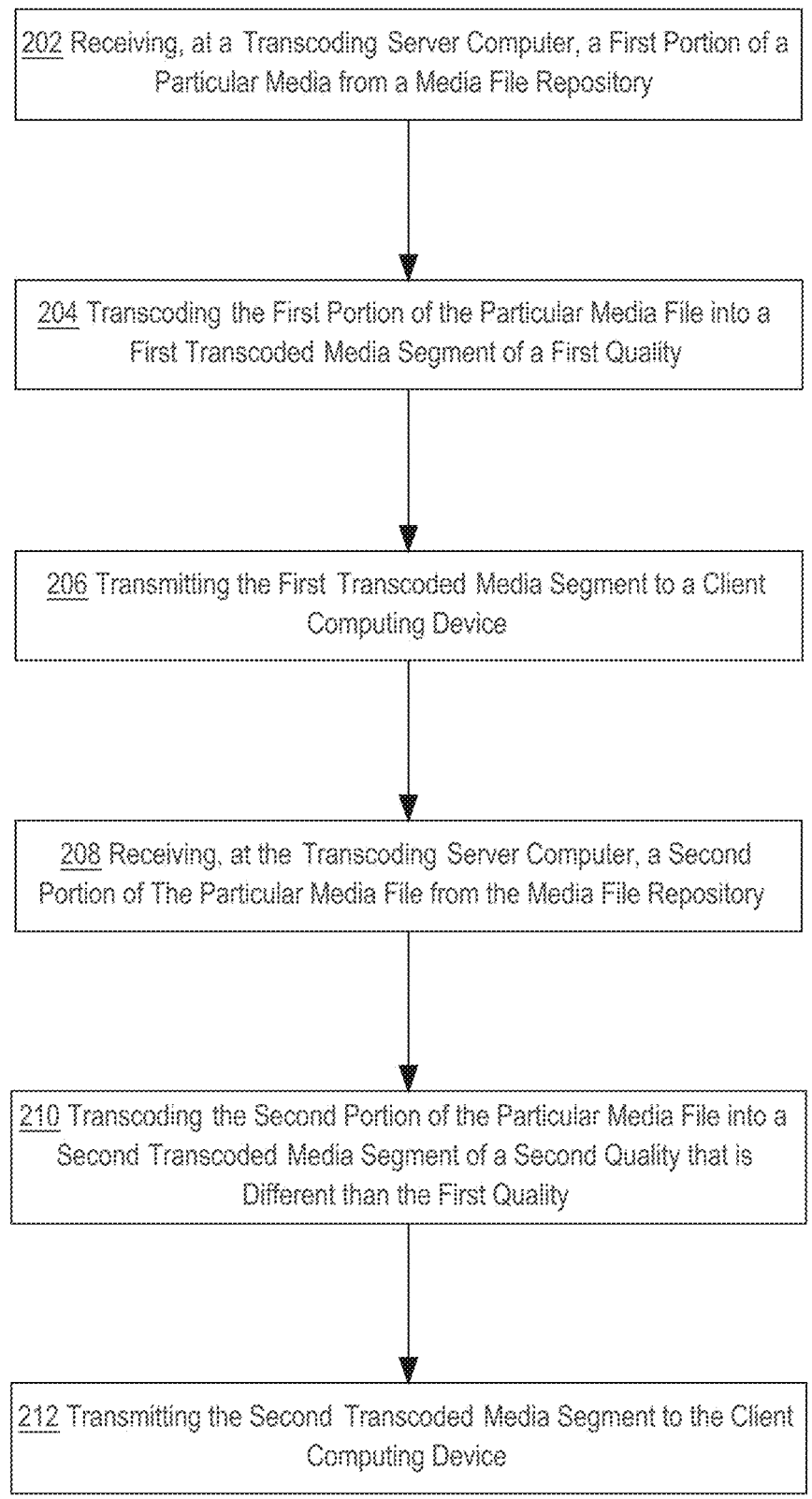
FIG. 2 depicts an example method of adaptive transcoding of a digital media file.

In an embodiment, a transcoding server computer adaptively transcodes portions of a digital media file into transcoded media segments of different qualities. FIG. 2 depicts an example method of adaptive transcoding of a digital media file.

At step 202, a first portion of a particular media file is received at a transcoding server computer from a media file repository. For example, a client computing device may request playback of a video file stored on the transcoding server computer. In response to receiving the request from the client computing device, a transcoding application may request a first portion of a media file from a media file repository stored on the transcoding server computer. Additionally or alternatively, the transcoding server computer may request the first portion of the media file from a media file repository stored on a separate server computer.

The first portion of the particular media file may refer to a particular segment of a plurality of sequential segments of the particular media file. For example, a digital movie may be broken up into a plurality of ten second long segments. The transcoding server computer may request segments of the digital media file sequentially, such that a requested segment immediately follows a previously requested segment. The transcoding server computer may ensure that the received portions of the media file may conform to one or more media streaming protocols before sending them to the client computing device. For example, the transcoding server computer may alter received portions of the media file in order to conform to the HTTP Live Streaming (HLS) protocol defined by Apple Inc. of Cupertino, Calif.

The first portion of the particular media file may refer to any segment of the plurality of sequential segments. Thus, the first portion of the particular media file may not be the beginning portion of the media file. In some embodiments, the beginning portion of the media file is pre-transcoded and the methods described herein are utilized for on-the-fly transcoding of additional segments of the media file.

At step 204, the first portion of the particular media file is transcoded into a first transcoded media segment of a first quality. For example, the transcoding server computer may execute transcoding software, such as a standard H.264 video decoder and encoder, to transcode the first portion of the particular media file into a transcoded media segment of the first quality. The transcoded media segment may be a file of a different format, bitrate, resolution, or any combination thereof. Code for implementing H.264 transcoders as well as other transcoders is available on GitHub.

The first quality may refer to a video bitrate, video resolution, audio bitrate, audio sampling rate, and/or audio channel count. In an embodiment, different transcoders are stored on the transcoding server computer, each of which configured to transcode digital media files to different bitrates. For example, a first transcoder may be configured to transcode a digital media file to 2 Mbit/s while a second transcoder is configured to transcode a digital media file to 4 Mbit/s. Additionally or alternatively, one or more transcoders may be configured to transcode digital media files to a plurality of different bitrates. For example, a single transcoder may be configured to select a bitrate from a plurality of bitrates for transcoding a file. As another example, a plurality of transcoders may each be configured to transcode received files to any of a plurality of bitrates.

At step 206, the first transcoded media segment is transmitted to a client computing device. For example, the transcoding server computer may transmit the first transcoded media segment over the network to the client computing device using one or more streaming protocols, such as the HLS protocols and/or other Dash protocols.

At step 208, a second portion of the particular media file is received at the transcoding server computer from the media file repository. The second portion of the particular media file may be a segment of the media file that is subsequent to the first portion of the particular media file. For example, the first portion of the particular media file may be a ten second segment of the particular media file. The second portion of the particular media file may be a ten second segment of the particular media file that plays after the first portion of the particular media file.

At step 210, the second portion of the particular media file is transcoded into a second transcoded media segment of a second quality that is different than the first quality. For example, the transcoding server computer may use a first transcoder to transcode the first portion of the media file into a first bitrate and a second transcoder to transcode the second portion of the media file into a second bitrate that is either higher or lower than the first bitrate. As another example, a single transcoder may be configured to transcode the first portion of the media file into the first bitrate and to transcode the second portion of the media file into a second bitrate that is either higher or lower than the first bitrate.

Transcoding the digital media file into different bitrates may comprise executing different transcoding algorithms for the digital media files. For example, a first algorithm may transcode an MPEG-2 video file into an MPEG-4 video file while a second algorithm may transcode the MPEG-2 video file into an H.264 video file. As another example, a first algorithm may transcode a video file into a first transcoded segment with a first resolution while a second algorithm may transcode the video file into a second transcoded segment with a second resolution.

At step 212, the second transcoded media segment is transmitted to the client computing device. For example, the transcoding server computer may transmit the second transcoded media segment over the network to the client computing device using one or more streaming protocols, such as the HLS protocols and/or other Dash protocols. While the steps of sending the transcoded segments are listed separately, in an embodiment multiple transcoded segments are transmitted as a single file. For example, the client computing device may join a plurality of segments together as new transcoded segments are produced prior to sending the segments to the client computing device. Thus, although the server computer requests and transcodes separate segments, the client computing device may download a full media file instead of downloading discrete segments of a media file.

In an embodiment, the transcoding server computer deletes transcoded media segments after sending them to the client computing device. By deleting sent transcoded media segments after they have been sent, the transcoding server computer is able to minimize the amount of data stored on the transcoding server computer. Additionally or alternatively, the transcoding server computer may store one or more of the transcoded media segments to use for subsequent plays of the digital media file. Thus, the transcoding server computer may still perform on the fly transcoding, but use one or more of the stored transcoded media segments when the quality of the stored transcoded media segments match the quality that the transcoding server computer is sending to the client computing device.

In an embodiment, the transcoding server computer transcodes portions of the digital media file while the client computing device is playing previously transcoded segments of the digital media file. For example, during playback of the first transcoded media segment, the transcoding server computer may begin transcoding of the second portion of the digital media file. Additionally, one or more portions of the digital media file may be transcoded in between the first and second portions. For example, a third and fourth portion of the digital media file may be transcoded into transcoded segments of the same quality as the first portion of the digital media file. While one or more of the transcoded segments are being played, the transcoding server computer may begin transcoding the second portion of the digital media file into a transcoded segment of a different quality.

Figure 3:
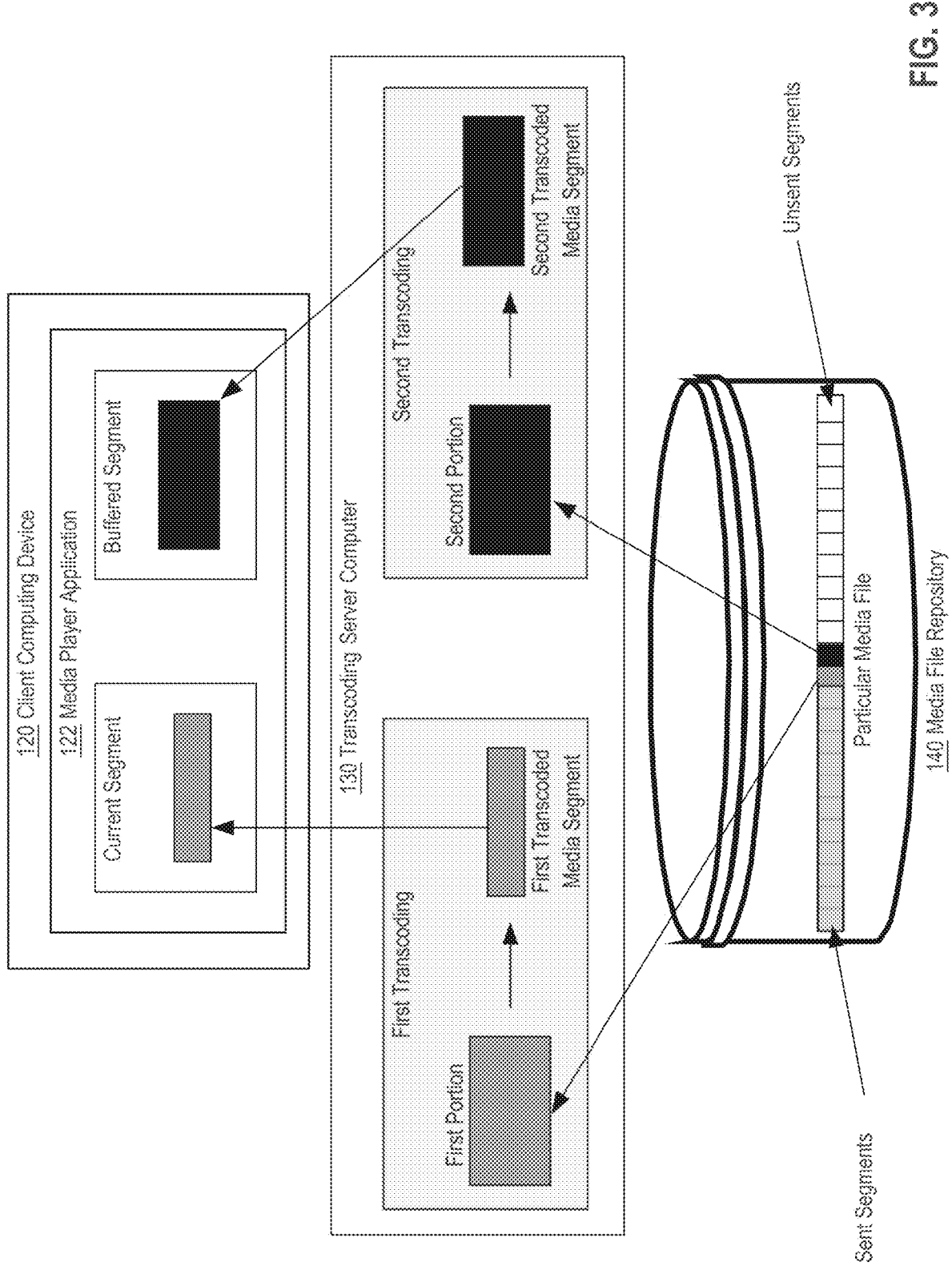
FIG. 3 depicts an example system executing the methods described herein.

FIG. 3 depicts an example system executing the methods described herein. While the example of FIG. 3 depicts media file repository 140 as separate from transcoding server computer 130, in some embodiments, media file repository 140 is stored on transcoding server computer 130 and sends segments of the particular media file to one or more transcoding applications executing on transcoding server computer 130.

In FIG. 3, media file repository 140 stores a particular media file. While the particular media file is broken up into segments for descriptive purposes, in embodiments the particular media file is stored as a single file that is broken up when it is sent to transcoding server computer 130. The darkened segments of the particular media file refer to segments of the particular media file that have been sent to transcoding server computer 130. The white segments of the particular media file refer to segments of the particular media file that have yet to be sent to transcoding server computer 130.

In FIG. 3, the first and second portions of the particular media file are sent to transcoding server computer 130. A first transcoding transcodes the first portion of the media file into a first transcoded media segment which is sent to client computing device 120 to be played through media player application 122. A second transcoding transcodes the second portion of the media file into a second transcoded media segment which is sent to client computing device 120 to be stored in a buffer of media player 122 until media player application 122 is ready to play the second transcoded segment.

In an embodiment, the buffer of the media player application 122 may store a plurality of transcoded media segments. The transcoded media segments may comprise different qualities. For example, a first buffered segment may comprise a bitrate of 2 Mbit/s while a second buffered segment may comprise a bitrate of 4 Mbit/s.

Adaptive Transcoding

In an embodiment, the transcoding server computer transcodes media files when the media files are being used. For example, a client computing device may request to view a particular media file that is stored in the media file repository. At the time the transcoding server computer receives the request, the transcoding server computer may not be storing any transcoded versions of the particular media file. A transcoding application executing on the transcoding server computer may request and receive portions of the particular media file, transcode them into transcoded media segments, and send them to the client computing device when ready. Thus, the transcoding application may transcode a portion of the media file while the client computing device is playing an earlier transcoded portion of the media file.

In an embodiment, the transcoding server computer may switch from transcoding into segments of a first quality to transcoding into segments of a second quality while the client computing device is playing earlier portions of the media file. The transcoding server computer may be configured to switch qualities based on performance of the client computing device. For example, if the transcoding server computer determines that the client computing device is capable of downloading files of a higher bitrate, the transcoding server computer may switch to transcoding the file into a higher bitrate. Alternatively, if the transcoding server computer determines that the client computing device is having trouble downloading files at a current bitrate, the transcoding server computer may lower the bitrate for transcoding future portions of the particular media file.

In an embodiment, the transcoding server computer monitors performance of the client computing device. For example, the transcoding server computer may measure a rate at which the client computing device downloads transcoded segments of a particular quality. The transcoding server computer may average the client computing device download speed over a particular period of time, such as the time it takes to download one complete segment. Additionally or alternatively, the transcoding server computer may monitor download speeds for a plurality of small bursts of time. For example, the transcoding server computer may determine how much of a transcoded media file has been downloaded at the start of a plurality of two second intervals and at the end of the plurality of two second intervals. Based on the amount of data that has been transferred in the two second intervals, the transcoding server computer may compute a plurality of different download rates.

In an embodiment, the client computing device monitors its own performance and sends its performance data to the transcoding server computer. For example, the client computing device may monitor the rate at which it downloads transcoded segments of the digital media file from the transcoding server computer. The client computing device may monitor a maximum download rate for a transcoded segment, an average download rate for a transcoded segment, and/or one or more download rates occurring during particular intervals of time. For example, the client computing device may measure the average download rate for each of a plurality of bursts of time. The client computing device may send the download rates for each burst of time, the average download rate for the burst of time, and/or a download rate for a burst of time with the highest download rate.

The transcoding server computer may be programmed or configured to transcode to different qualities based on the performance of the client computing device. For example, if the client computing device downloads a ten second long segment of a particular media file at a particular bitrate in five seconds, then the transcoding server computer may determine that the client computing device is capable of downloading transcoded segments of a higher bitrate without adversely affecting playback of the video.

In an embodiment, the transcoding server computer is programmed or configured to transcode to different qualities based on the performance of the client computing device during particular bursts of time. For example, the transcoding server computer may measure a plurality of download rates during a plurality of intervals of times. The plurality of intervals of times may be as small as a few milliseconds or as large as multiple seconds. The transcoding server computer may identify a particular interval of time as being indicative of an overall capability of the client computing device. For example, the transcoding server computer may select the highest download speed the client computing device attained during the plurality of intervals of time.

The transcoding server computer may compute a value indicative of the possible quality change based on the performance of the client computing device. As an example, the server computer may compute a maximum quality for the digital media file such that the digital media file is capable of being downloaded as fast as it is played. The maximum quality may be computed as a product of the current quality and the rate at which data of the current quality is downloaded. The transcoding server computer may then select the maximum quality as the second quality for transcoding the digital media file.

In an embodiment, the transcoding server computer incrementally changes the quality of the transcoded segments based on determinations that the client computing device is capable of downloading higher or lower quality versions of the digital media file without interrupting or pausing a current stream. For example, the transcoding server computer may be programmed or configured to increase the bitrate of the transcoded segments by 1 Mbit/s in response to determining that the client computing device is capable of downloading the current segment faster than the client computing device is playing the digital media file. The transcoding server computer may also be programmed or configured to decrease the quality of transcoded segments by 2 Mbit/s in response to determining that the client computing device is not capable of downloading the current segment as fast as the client computing device is playing the digital media file.

By increasing the quality of the transcoded segments incrementally, the transcoding server computer minimizes the chance that the quality will be raised so high that the playback of the digital media file on the client computing device catches up to the end of the downloaded content, thereby disrupting playback of the digital media file. By decreasing the quality of the transcoded segments incrementally, the transcoded server computer minimizes the negative impact of quality reduction on the viewer of the digital media file. Additionally, changing the quality of the transcoded segments incrementally ensures that the change in quality is less noticeable to the viewer of the digital media file.

In an embodiment, the transcoding server computer changes the quality of the transcoded segments incrementally, but with larger changes for larger differences in the capabilities of the client computing device and the quality of the last transcoded segment. For example, the transcoding server computer may be programmed or configured to increase the quality by 2 Mbit/s if the transcoding server computer determines that the client computing device is capable of downloading files of qualities between 2 Mbit/s and 4 Mbit/s higher than the last transcoded segment without adversely affecting playback of the file. The transcoding server computer may be further programmed or configured to instead increase the quality by 3 Mbit/s if the transcoding server computer determines that the client computing device is capable of downloading files of qualities between 4 Mbit/s and 5 Mbit/s higher than the last transcoded segment without adversely affecting playback of the file. The differences in quality change based on ranges of capabilities allows the transcoding server computer to be more adaptive to the individual client computing device while still maintaining the benefits of incremental changes.

The transcoding server computer may use different metrics for determining whether to increase the quality of transcoded segments than for determining whether to decrease the quality of transcoded segments. In an embodiment, the transcoding server computer increases the quality of transcoded segments comparatively slower than the transcoding server computer decreases the quality of transcoded segments. As an example, the transcoding server computer may increase the quality of transcoded segments incrementally by 1 Mbit/s, but decrease the quality of transcoded segments incrementally by 2 Mbit/s. As another example, the transcoding server computer may increase the quality only if the difference in quality between the highest download rate quality of the client computing device and the last transcoded segment is greater than a first threshold value, such as 2 Mbit/s. In contrast, the transcoding server computer may decrease the quality only if the difference in quality between the last transcoded segment and the highest download rate quality of the client computing device is greater than a second threshold value that is lower than the first threshold value, such as 1 Mbit/s.

By changing the transcoding quality based on the current bandwidth between the transcoding server computer and the client computing device, the transcoding server computer adapts to the capabilities of the client computing device, thereby maximizing the quality of video transcoding received by the client computing device while minimizing adverse effects on video playback, such as forcing the client computing device to pause the video while new data is downloaded. Additionally, the transcoding server computer is able to adapt to changes in capabilities of the client computing device over time. Thus, if the connection quality between the client computing device and the transcoding server computer changes, the transcoding server computer is capable of adjusting the quality of the transcoding in response.

In an embodiment, the transcoding server computer transcodes additional segments of the digital media file. For example, some transcoding programs introduce audio and/or visual errors in the beginning of a transcoded media segment. In order to avoid playing transcoded segments with errors, the transcoding server computer may begin transcoding prior to the next segment in the digital media file. For example, the transcoding server computer may initially transcode a first portion of a digital media file into a first quality. When the transcoding server computer changes to a second quality for a subsequent portion of the digital media file, the transcoding server computer may transcode both the first portion of the digital media file and the subsequent portion of the digital media file into the second quality. The transcoding server computer may then send a transcoded segment corresponding to the subsequent portion of the digital media file to the client computing device without sending a transcoded segment corresponding to the first portion of the digital media file. By including a prior transcoded segment into a subsequent transcoding of a different quality, the transcoding server computer avoids displaying any errors that occur at the start of the transcoding.

Buffer Starvation

Many media playback applications have a limited amount of data that can be stored in a buffer of the media playback application on the client computing device. The client computing device may reduce the speed at which data is downloaded from the transcoding server computer as the buffer of the media playback application fills, thereby reducing the perceived capabilities of the client computing device from the perspective of the transcoding server computer. Additionally, the client computing device may continually request new segments from the transcoding server computer. In order to limit proliferation of false information based on a reduced download speed, the transcoding server computer may limit the amount of information sent to the client computing device. Thus, the transcoding server computer may wait to respond to the client request for new segments in order to reduce the amount of data stored in the client computing device's buffer. Waiting to respond to the client request may include waiting to transcode and/or send new segments to the client computing device. Additionally or alternatively, the transcoding server computer may limit the amount of information sent to the client computing device by slowing the transfer of data from the server computer to the client computing device.

In an embodiment, data identifying the capacity and/or current storage of the buffer is sent from the client computing device to the transcoding server computer. For example, the client computing device may monitor the buffer of the media playback application to determine how much space is left in the buffer. The transcoding server computer may periodically request data from the client computing device regarding the current availability in the buffer. In response to receiving the request from the transcoding server computer, the client computing device may send data to the transcoding server computer identifying how much space is left in the buffer.

Additionally or alternatively, the transcoding server computer may monitor how much data is sent to the client computing device. The transcoding server computer may additionally request a playback timestamp from the client computing device indicating a current timestamp in the playback of the digital media file. Based on the amount of data sent to the client computing device and the playback timestamp, the transcoding server computer may estimate how much data is stored in the buffer. For example, if the client computing device reports that the playback timestamp is fifteen seconds into a video and the client has downloaded three segments of video, each segment comprising ten seconds of video, the transcoding server computer may estimate that fifteen seconds of video are stored in the buffer of the client computing device.

The transcoding server computer may store a buffer threshold value for limiting data sent to the client computing device. If the amount of data that the transcoding server computer determines is stored in the buffer of the client computing device exceeds the buffer threshold value, the transcoding server computer may wait to send a next transcoded segment to the client computing device. When the transcoding server computer determines that the amount of data stored in the buffer no longer exceeds the buffer threshold value, the transcoding server computer may send the next transcoded segment to the client computing device.

The buffer threshold value may be a general value, a device-specific value, and/or an application-specific value. For example, the transcoding server computer may store a general buffer threshold value of 20 seconds. If the length of video that the transcoding server computer determines is stored in the buffer of a client computing device is less than 20 seconds, the transcoding server computer may transcode and send a next segment to the client computing device. Otherwise, the transcoding server computer may wait to send a next segment until the length of video in the buffer is less than the buffer threshold value.

In embodiments where the client computing device sends data to the transcoding server computer identifying the size of the buffer on the client computing device, the transcoding server computer may base the buffer threshold value on the size of the buffer on the client computing device. For example, the transcoding server computer may use as a buffer threshold value a value equal to half of the size of the buffer on the client computing device. Thus, if the buffer on the client computing device can hold sixty seconds of video, the transcoding server computer may set thirty seconds of video as the buffer threshold value.

In some embodiments, the transcoding server computer may store data identifying a buffer size for different media playback applications. Thus, the transcoding server computer may select buffer threshold values for each media playback application for which the transcoding server computer knows the buffer size. When the transcoding server computer begins sending transcoded segments to a client computing device, the transcoding server computer may identify the media playback application executing on the client computing device. Based on the media playback application, the transcoding server computer may identify a buffer threshold value. For example, the transcoding server computer may select a buffer threshold value that is equal to half the buffer size. Thus, if a particular media playback application has a buffer size of sixty seconds, the transcoding server computer may identify the buffer threshold value as thirty seconds for the particular media playback application.

In an embodiment, the transcoding server computer reduces the amount of data sent to the client computing device by reducing the amount of data sent to the one or more transcoders of the transcoding server computer. For example, the transcoding server computer may use the buffer threshold value to determine when to request a new segment of the digital media file be sent to the transcoder from the digital media repository. In embodiments where the media file repository is stored on the transcoding server computer, the transcoding application on the transcoding server computer may wait to request data from the media file repository until the amount of data stored in the buffer is below the buffer threshold value. In embodiments where the media file repository is stored on a separate server computer, the transcoding server computer may wait to request a new segment from the separate server computer until the amount of data stored in the buffer is below the buffer threshold value.

While the buffer threshold value is generally described as a singular value above which the transcoding server computer does not send new segments, the buffer threshold value may also be dependent on the size of the segment being sent. For example, the transcoding server computer may be programmed or configured to determine how much data will be stored in the buffer after a next segment has been sent and determine whether that value is above or below a particular value. Thus, the buffer threshold value may be based, at least in part, on the size of the segment being sent and an estimated time it will take the client computing device to download the segment.

By reducing the amount of data stored in the buffer of the client computing device, the transcoding server computer ensures that the client computing device is attempting to download the digital media file at the fastest possible rate. Thus, the client computing device will be sending more accurate data on the capabilities of the client computing device instead of slowing its own download rate in order to ensure that its buffer does not become overfilled.

In an embodiment, the server computer adjusts the buffer threshold value to generate bursts of high speed downloads by the client computing device. For example, the transcoding server computer may initially set a buffer threshold value of twenty seconds. The transcoding server computer may increase the buffer threshold value to thirty seconds and measure how long it takes to download the next ten seconds of video. The transcoding server computer may reduce the buffer threshold back to twenty seconds afterwards so another burst can be measured at a later time. By generating the bursts of high speed downloading, the server computer is able to measure how long it takes the client computing device to download larger sections of video of a particular quality prior to determining whether to increase or decrease the quality of video sent to the client computing device.

Transcoding Default Values

The transcoding server computer may store a general default transcoding value for transcoding digital media files. For example, a default transcoding value of 2 Mbit/s may be set for each client computing device. Thus, when a client computing device requests a transcoded digital media file, the transcoding server computer may begin transcoding the digital media file to a quality of 2 Mbit/s. The transcoding server computer may then raise the quality of the transcoding based on the capabilities of the server computer. Thus, if a client computing device with a fast internet connection begins downloading a digital media file at five times the speed of playback, the transcoding server computer may greatly increase the quality of the transcoding for the client computing device.

In an embodiment, the transcoding server computer stores default transcoding values for individual client computing devices that override the general default transcoding value. For example, a client computing device may initially request a default transcoding quality value of 5 Mbit/s for the client computing device. When the transcoding server computer begins transcoding for the client computing device, the transcoding server computer may begin transcoding at 5 Mbit/s. If the client computing device downloads the first one or more transcoded segments too slowly, the transcoding server computer may reduce the transcoding quality. If the client computing device downloads the first one or more transcoded segments too quickly, the transcoding server computer may raise the transcoding quality.

In an embodiment, default transcoding values for individual client computing devices may be based on the performance of the client computing device in prior situations. For example, during the first playback of a digital media file, the transcoding server computer may adjust the transcoding quality to match the capabilities of the client computing device. Thus, by the end of the first playback, the transcoding quality may be reflective of the client computing device's ability to download transcoded digital media files. Thus, when the client computing device requests a digital media file, the transcoding server computer may begin transcoding the digital media file into a transcoded segment of a quality at or near the quality of the last transcoded segment at the end of the first playback.

The transcoding server computer may also store default transcoding values based on the type of connection. For example, a first default transcoding value may be set for Local Area Networks (LAN); a second default transcoding value may be set for Wide Area Networks (WAN), and a third default transcoding value may be set for certain types of interne networks. Thus, based on the type of network, the transcoding server computer may begin transcoding the digital media file at different qualities.

In an embodiment, the transcoding server computer uses any combination of the above described factors to set default transcoding values. For example, a default transcoding value may be based on the client computing device and the network type. Thus, a particular client computing device may be associated with a plurality of default transcoding values based on the type of network connection.

The transcoding server computer may also store minimum transcoding values indicating a minimum quality for transcoding digital media files. Minimum transcoding values may be set to ensure a minimum level of quality regardless of the abilities of the client computing device, thereby ensuring that the quality of a transcoded video does not fall so far as to be unwatchable due to a poor connection of the client computing device. Additionally, the client computing device may set a minimum transcoding value in order to prioritize quality of the video over immediate accessibility.

Additionally, the transcoding server computer may store maximum transcoding values indicating a maximum quality for transcoding digital media files. For instance, a client computing device, such as a smartphone, may download files subject to particular data limits. In order to ensure that the client computing device does not download too large of a file, thereby using a large percentage of allotted data, the client computing device may set a maximum transcoding value. The maximum transcoding value may also be dependent on a type of connection. For example, a smart phone may set a maximum transcoding value for when the smart phone is downloading a file over a mobile data connection, but no maximum transcoding value for when the smart phone is downloading the file over a Wi-Fi connection.

Maximum transcoding values may also be based on the capabilities of the transcoding server computer. For example, the transcoding server computer may only have bandwidth to upload files of a particular quality to other devices. Thus, the transcoding server computer may set the maximum transcoding value to the particular quality, thereby ensuring that the transcoding server computer is capable of uploading the transcoded files to the client computing device. As the available bandwidth for the transcoding server computer changes, such as due to connection problems, the transcoding server computer may change the maximum transcoding value to compensate.

Transcoding Load Balancing

In an embodiment, the transcoding server computer changes transcoding qualities in order to balance a load on the transcoding server computer. The load may refer to a network load and/or use of the resources of the transcoding server computer. Thus, the transcoding server computer may base a change in quality on the capabilities of the transcoding server computer through either a network load and/or output load, the current quality of a particular transcoded segment, and a starting transcoding quality for transcoding a second digital media file for a different client computing device.

As an example, a transcoding server computer has available bandwidth to upload digital media files with an aggregate quality of 10 Mbit/s at a given time. A first client computing device begins downloading a digital media file from the transcoding server computer. Overtime, the quality of the transcoded segments sent to the client computing device increases to 10 Mbit/s. If a second client computing device requests a digital media file from the transcoding server computer, the transcoding server computer may adjust the transcoding quality for the first client computing device in order to free up bandwidth for the second client computing device.

As another example, a server computer may be limited to output based on the output resolution of a video. For example, the server computer may have enough power to output two high definition 1080 p video streams. If the transcoding server computer begins performing other tasks and/or transcoding and sending streams to other devices, the transcoding server computer may reduce the quality of the high definition streams based on the increased load on the server computer's resources.

In an embodiment, the transcoding server computer starts new data streams at a general minimum transcoding quality and reduces the quality of a prior transcoded file in order to compensate. For example, in the above example, the transcoding server computer may store a general default transcoding value of 2 Mbit/s. Thus, the transcoding server computer may reduce the quality of the transcoded files sent to the first client computing device to 8 Mbit/s, thereby freeing up enough bandwidth for the transcoding server computer to send files of 2 Mbit/s to the second transcoding server computer.

The transcoding server computer may continue to load balance by increasing the quality of the transcoded segments sent to the second client computing device while reducing the quality of the transcoded segments sent to the first client computing device. For example, if the transcoding server computer determines that the second client computing device is capable of downloading a digital media file at a quality higher than 2 Mbit/s, the transcoding server computer may raise the quality of the transcoded segments for the second client computing device while lowering the quality of the transcoded segment for the first client computing device.

In an embodiment, the transcoding server computer increases the quality of transcoded segments for subsequent digital media files up to a limit based on the quality of a current transcoding of a digital media file. For example, in the above example, the transcoding server computer may set a limit for increasing the quality of the second digital media file to 5 Mbit/s, thereby ensuring that the quality of the transcoding of the first media file never drops below the quality of the second digital media file.

Additionally or alternatively, the transcoding server computer may ensure that a quality of the transcoding for the first media file does not drop below a specified minimum quality for the first digital media file. Thus, if a general minimum quality is set at 2 Mbit/s, the transcoding server computer may raise the quality of the second digital media file to a maximum of 8 Mbit/s, thereby ensuring that the quality of the first digital media file does not drop below 2 Mbit/s.

In an embodiment, a client computing device may specify one or more devices and/or streams to be given priority over other devices and/or streams in terms of quality. In the above example, if the first client computing device sends data to the transcoding server computer requesting that the first client computing device be prioritized over the second client computing device, then the transcoding server computer may begin transcoding the second digital media file to a quality of 2 Mbit/s without raising the quality based on the capabilities of the second client computing device. If the transcoding server computer lowers the quality of the transcoding of the first digital media file due to the capabilities of the first client computing device changing, then the transcoding server computer may begin to raise the quality of the transcoding of the second digital media file. If the transcoding server computer determines that the first client computing device can handle a file of a higher quality again, then the transcoding server computer may increase the quality of the first digital media file to a maximum quality of 8 Mbit/s and lower the quality of the second digital media file to a minimum of 2 Mbit/s.

The load balancing techniques described herein allow the transcoding server computer to balance quality of transcoded digital media files with capabilities of the transcoding server computer. Thus, as the transcoding server computer's ability to upload digital media files increases, the transcoding server computer may gradually increase the quality of transcoded digital media files. While the above examples describe balancing based on two client computing devices, the load balancing techniques described herein may be used with any number of client computing devices as long as the transcoding server computer is capable of sending minimum quality transcoded files to each client computing device. If the transcoding server computer is unable to send minimum quality transcoded files to each client computing device, the transcoding server computer may lower the quality of some files below the minimum quality, stagger the sending of transcoded segments, and/or select one or more client computing devices to not receive a transcoded digital media file.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
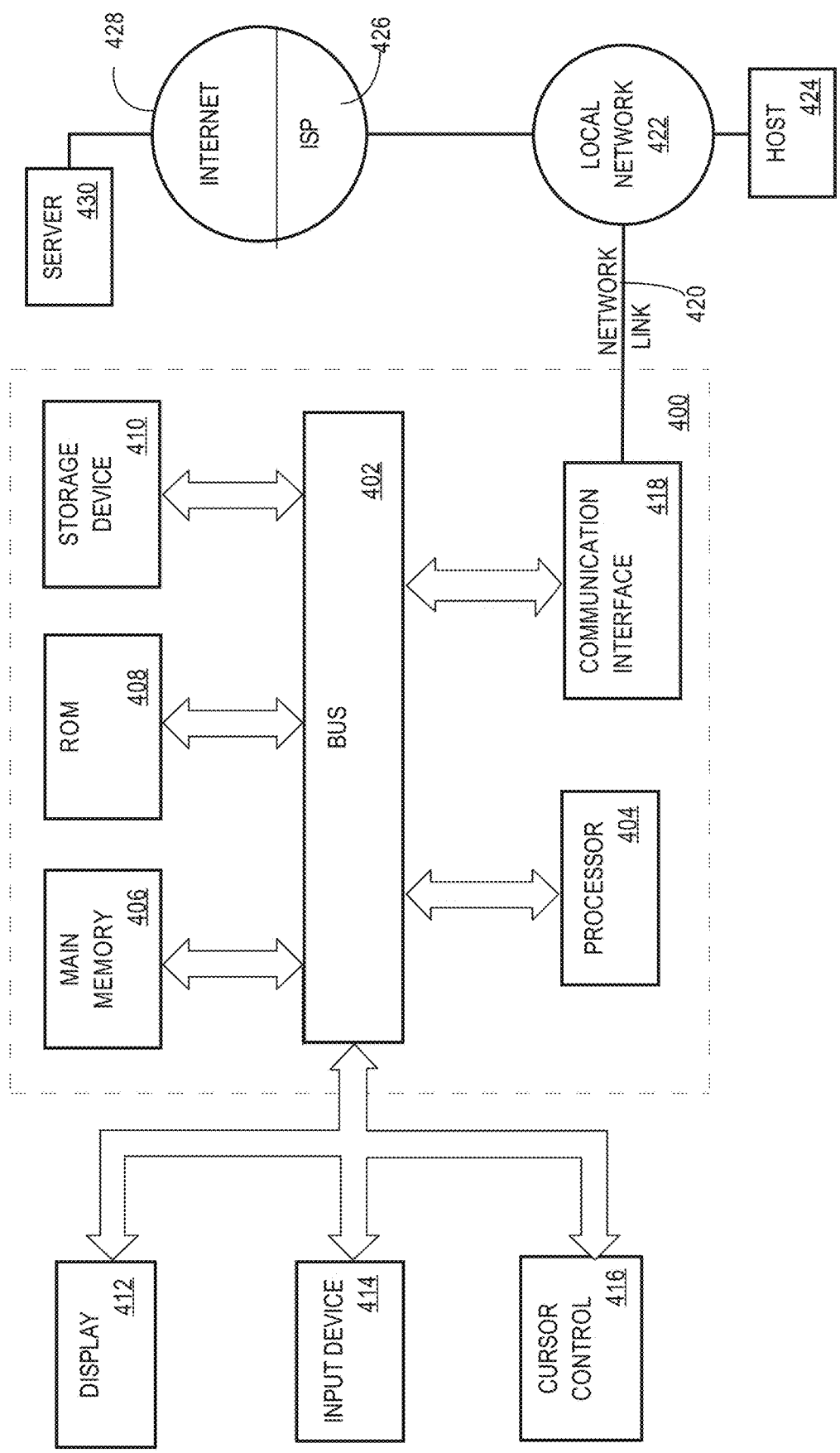
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   sending, from a server computer to a client computing device, a first portion of a particular media file;
   storing, at a server computer, a buffer threshold value;
   receiving, from the client computing device, first playback data identifying a first playback timestamp;
   determining, at the server computer, that a first difference between an amount of the particular media file sent to the client computing device and the first playback timestamp exceeds the buffer threshold value and, in response, waiting to send a second portion of the particular media file from the server computer to the client computing device;
   receiving, from the client computing device, second playback data identifying a second playback timestamp;
   determining, at the server computer, that a second difference between the amount of the particular media file sent to the client computing device and the second playback timestamp does not exceed the buffer threshold value and, in response, sending the second portion of the particular media file from the server computer to the client computing device;
   measuring a first download speed of the client computing device for the second portion of the partial media file;
   adjusting the buffer threshold value;
   receiving, from the client computing device, third playback data identifying a third playback timestamp;
   determining that a third difference between the amount of the particular media file sent to the client computing device and the third playback timestamp does not exceed the buffer threshold value and, in response, sending a third portion of the particular media file to the client computing device;
   measuring a second download speed of the client computing device for the third portion of the particular media file.

2. The method of claim 1, further comprising:
   transcoding the first portion of the particular media file to a first quality prior to sending the first portion of the particular media file to the client computing device;
   transcoding the second portion of the particular media file to a second quality that is different than the first quality after sending the first portion of the particular media file to the client computing device, but prior to sending the second portion of the particular media file to the client computing device.

3. The method of claim 2, further comprising waiting to transcode the second portion of the particular media file until the server computer determines that a difference between the amount of the particular media file sent to the client computing device and the playback timestamp of the client computing device does not exceed the buffer threshold value.

4. The method of claim 1, wherein the client computing device periodically sends data to the server computer identifying a current playback timestamp.

5. The method of claim 1, wherein the buffer threshold value is computed based on a size of buffer of the client computing device.

6. The method of claim 1, further comprising:
   storing a plurality of buffer threshold values and data identifying one or more media applications for each of the buffer threshold values;
   receiving data identifying a particular media application executing on the client computing device;
   adjusting the buffer threshold value based on the data for the buffer threshold value identifying the particular media application.

7. The method of claim 1, wherein the buffer threshold value is based, at least in part, on a size of the second portion of the particular media file.

8. The method of claim 1, further comprising identifying a quality at which to transcode future portions of the particular media file based, at least in part, on the second download speed.

9. A computing system comprising:
   one or more processors
   a memory, coupled to the one or more processors, storing instructions which, when executed by the one or more processors, cause performance of:
   sending, to a client computing device, a first portion of a particular media file;
   storing a buffer threshold value;
   receiving, from the client computing device, first playback data identifying a first playback timestamp;
   determining, at the server computer, that a first difference between an amount of the particular media file sent to the client computing device and the first playback timestamp exceeds the buffer threshold value and, in response, waiting to send a second portion of the particular media file from the server computer to the client computing device;
   receiving, from the client computing device, second playback data identifying a second playback timestamp;
   determining, at the server computer, that a second difference between the amount of the particular media file sent to the client computing device and the second playback timestamp does not exceed the buffer threshold value and, in response, sending the second portion of the particular media file from the server computer to the client computing device;
   measuring a first download speed of the client computing device for the second portion of the partial media file;
   adjusting the buffer threshold value;
   receiving, from the client computing device, third playback data identifying a third playback timestamp;
   determining that a third difference between the amount of the particular media file sent to the client computing device and the third playback timestamp does not exceed the buffer threshold value and, in response, sending a third portion of the particular media file to the client computing device;

measuring a second download speed of the client computing device for the third portion of the particular media file.

10. The computing system of claim 9, wherein the instructions, when executed by the one or more processors, further cause performance of:

transcoding the first portion of the particular media file to a first quality prior to sending the first portion of the particular media file to the client computing device;

transcoding the second portion of the particular media file to a second quality that is different than the first quality after sending the first portion of the particular media file to the client computing device, but prior to sending the second portion of the particular media file to the client computing device.

11. The computing system of claim 10, wherein the instructions, when executed by the one or more processors, further cause performance of waiting to transcode the second portion of the particular media file until the system determines that a difference between the amount of the particular media file sent to the client computing device and the playback timestamp of the client computing device does not exceed the buffer threshold value.

12. The computing system of claim 9, wherein the client computing device periodically sends data to the system identifying a current playback timestamp.

13. The computing system of claim 9, wherein the buffer threshold value is computed based on a size of buffer of the client computing device.

14. The computing system of claim 9, wherein the instructions, when executed by the one or more processors, further cause performance of:

storing a plurality of buffer threshold values and data identifying one or more media applications for each of the buffer threshold values;

receiving data identifying a particular media application executing on the client computing device;

adjusting the buffer threshold value based on the data for the buffer threshold value identifying the particular media application.

15. The computing system of claim 9, wherein the buffer threshold value is based, at least in part, on a size of the second portion of the particular media file.

16. The computing system of claim 9, wherein the instructions, when executed by the one or more processors, further cause performance of identifying a quality at which to transcode future portions of the particular media file based, at least in part, on the second download speed.

* * * * *